United States Patent [19]

Mucher et al.

[11] Patent Number: 5,083,830
[45] Date of Patent: Jan. 28, 1992

[54] TRUCK BED INSERT

[76] Inventors: Carl R. Mucher; Hazel A. Mucher, both of 107 Rainbow Ave., Warner Robins, Ga. 31093

[21] Appl. No.: 673,008
[22] Filed: Mar. 21, 1991
[51] Int. Cl.$^5$ ............................................. B62D 33/00
[52] U.S. Cl. ..................................... 296/39.2; 40/591; 296/37.6
[58] Field of Search .................... 296/39.2, 39.1, 39.3, 296/37.6; 40/591

[56] References Cited

U.S. PATENT DOCUMENTS

| | | | |
|---|---|---|---|
| 4,162,098 | 7/1979 | Richardson, III | 296/39.2 |
| 4,188,058 | 2/1980 | Resa et al. | 296/39.2 |
| 4,572,568 | 2/1986 | Kapp et al. | 296/39.2 |
| 4,802,705 | 2/1989 | Ewell | 296/39.2 |

Primary Examiner—Robert R. Song
Attorney, Agent, or Firm—Leon Gilden

[57] ABSTRACT

An apparatus wherein an insert is mounted in a complementary manner within a pickup truck bed to include spaced side walls, a forward wall, and a bottom floor spaced from a top floor defining a pocket therebetween. The pocket receives a plate member, including a decorative member mounted on the plate member to provide various decorative enhancements of the truck bed in use.

3 Claims, 5 Drawing Sheets

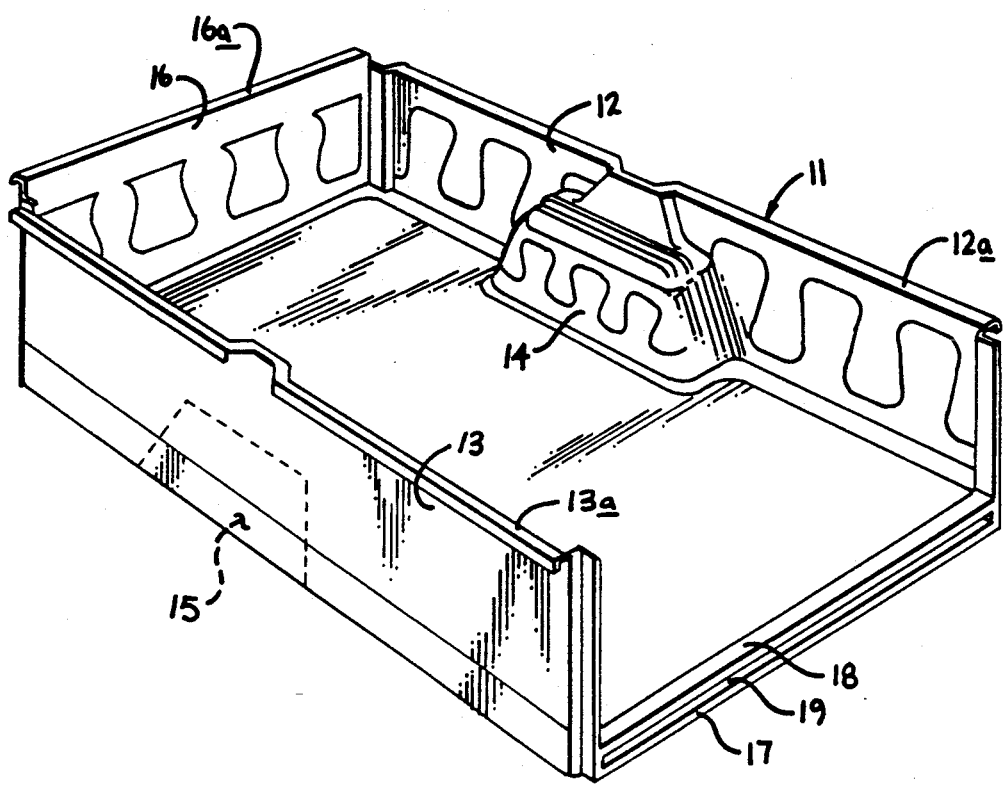
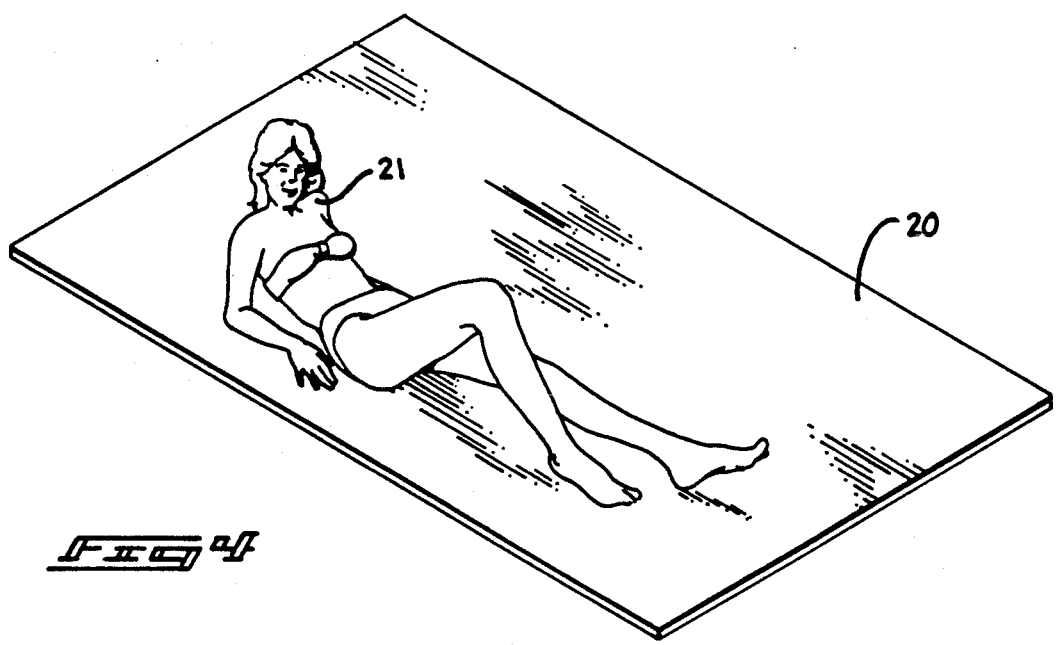

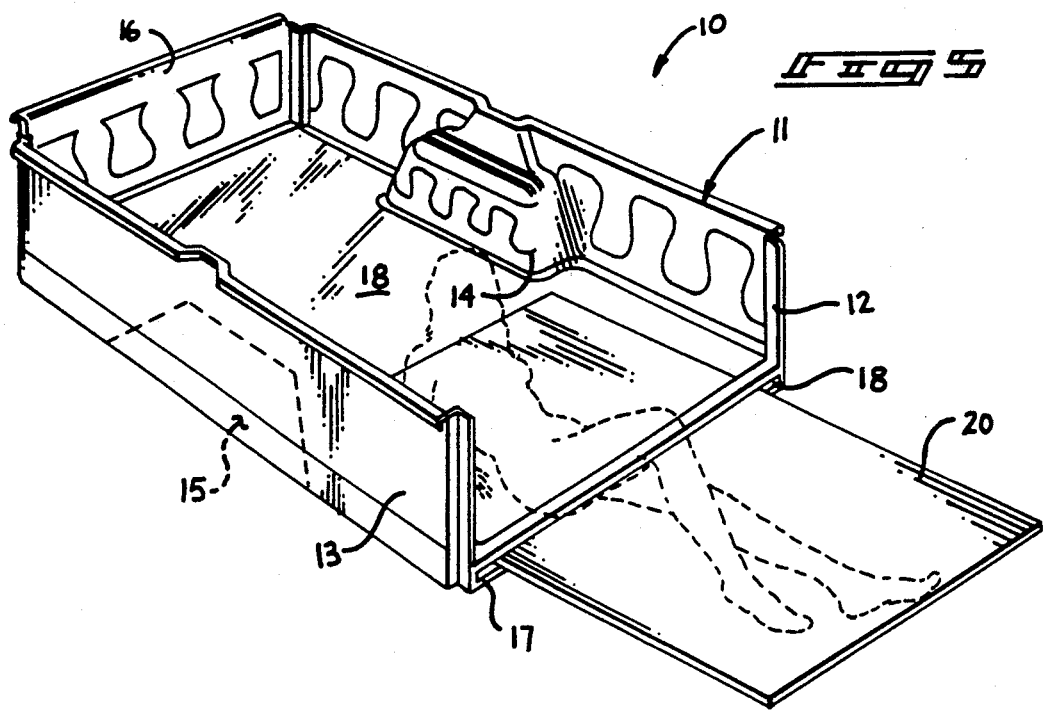
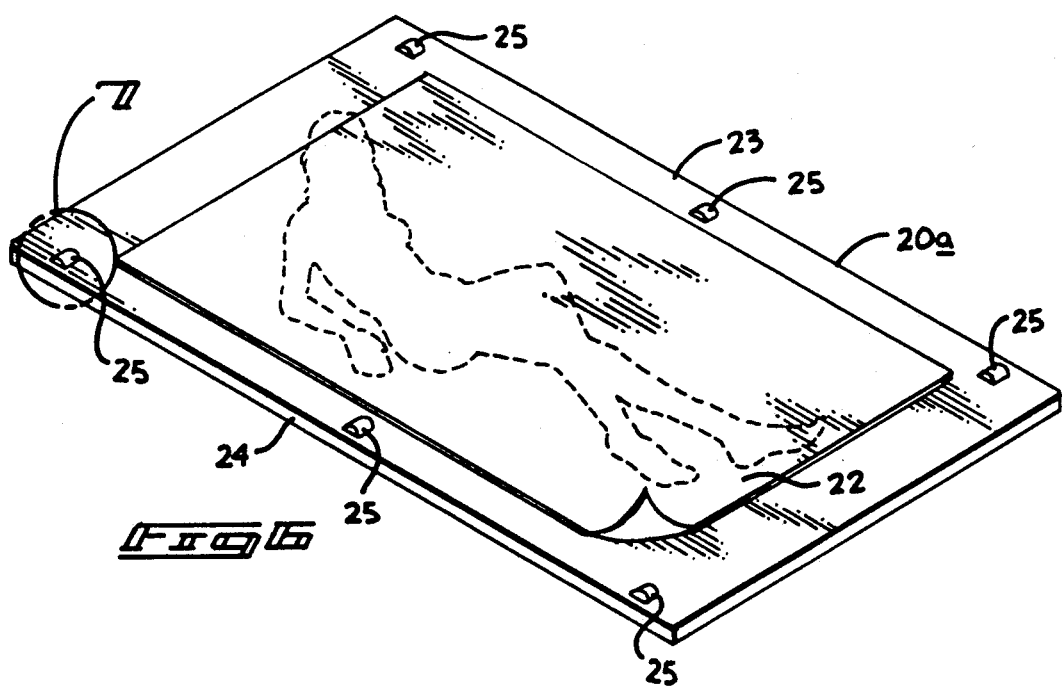

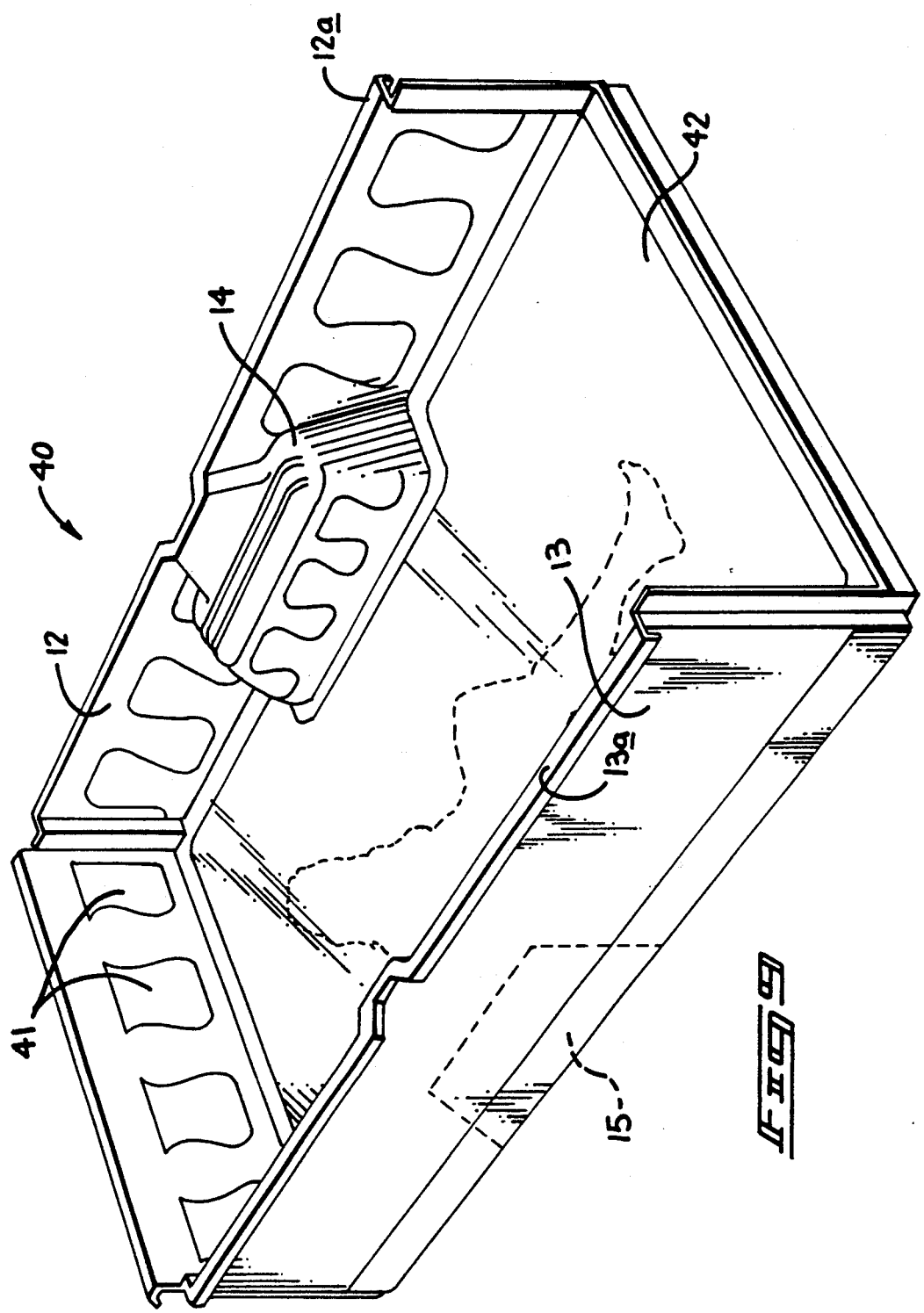

TRUCK BED INSERT

BACKGROUND OF THE INVENTION

1. Field of the Invention

The field of invention relates to truck bed liner apparatus, and more particularly pertains to a new and improved truck bed insert in forward wall and/or floor wherein the same is arranged for selectively changing insert floor configurations of the organization providing various pictorial modifications for use in a modification of the insert.

2. Description of the Prior Art

Various insert structure has been utilized in the prior art for providing decorative protection of an associated truck bed. Such truck bed inserts are of a unitary configuration, wherein the instant invention attempts to provide an insert that permits modifying pictorial forward wall and/or floor patterns for positioning various pictorial logos and the like for the use of the truck in advertising, enjoyment, and amusement of individuals.

SUMMARY OF THE INVENTION

In view of the foregoing disadvantages inherent in the known types of truck bed inserts now present in the prior art, the present invention provides a truck bed insert wherein the same utilizes an insert formed with a pocket defined by spaced forward wall and/or floors to provide mounting and reception of various pictorial and graphic representations in the insert. As such, the general purpose of the present invention, which will be described subsequently in greater detail, is to provide a new and improved truck bed insert which has all the advantages of the prior art truck bed inserts and none of the disadvantages.

To attain this, the present invention provides an apparatus wherein an insert is mounted in a complementary manner within a pickup truck bed to include spaced side walls, a forward wall, and a bottom floor spaced from a top floor defining a pocket therebetween. The pocket receives a plate member, including a decorative member mounted on the plate member to provide various decorative enhancements of the truck bed in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck bed insert which has all the advantages of the prior art truck bed inserts and none of the disadvantages.

It is another object of the present invention to provide a new and improved truck bed insert which may be easily and efficiently manufactured and marketed.

It is a further object of the present invention to provide a new and improved truck bed insert which is of a durable and reliable construction.

An even further object of the present invention is to provide a new and improved truck bed insert which is susceptible of a low cost of manufacture with regard to both materials and labor, and which accordingly is then susceptible of low prices of sale to the consuming public, thereby making such truck bed insert economically available to the buying public.

Still yet another object of the present invention is to provide a new and improved truck bed insert which provides in the apparatuses and methods of the prior art some of the advantages thereof, while simultaneously overcoming some of the disadvantages normally associated therewith.

Still another object of the present invention is to provide a new and improved truck bed insert wherein the same selectively receives a plate member between spaced floors of the insert to provide modifying configurations of logo and amusement type graphic representations for enjoyment of individuals in use of the truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of an insert member utilized by the instant invention.

FIG. 4 is an isometric illustration of an insert plate utilized by the instant invention.

FIG. 5 is an isometric illustration of the liner and insert plate in a partially assembled configuration.

FIG. 6 is an isometric illustration of a modified insert plate utilized by the instant invention.

FIG. 9 is an isometric illustration of a further configuration utilized by the instant invention.

DESCRIPTION OF THE PREFERRED EMBODIMENT

Figure 1:
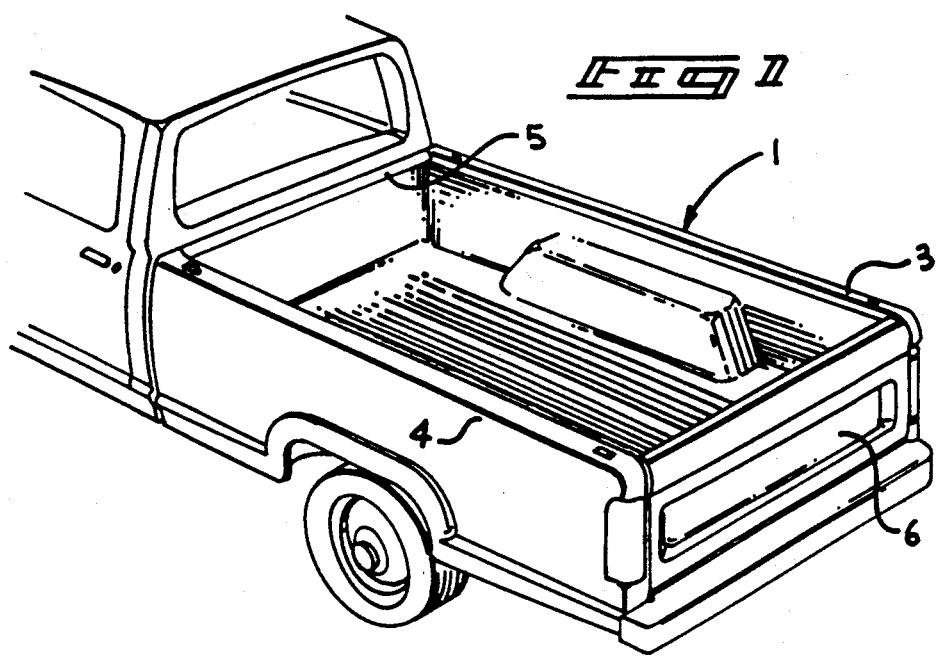
FIG. 1 is an isometric illustration of a prior art truck bed insert organization.

With reference now to the drawings, and in particular to FIGS. 1 to 9 thereof, a new and improved truck bed insert embodying the principles and concepts of the present invention and generally designated by the reference numeral 10 will be described.

Figure 2:
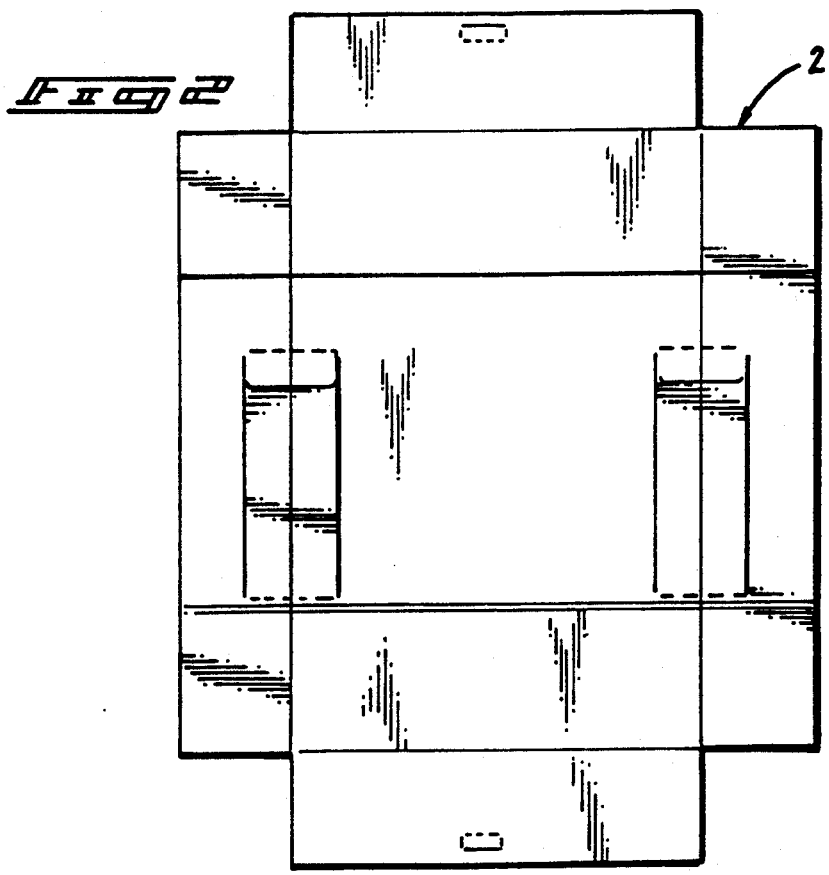
FIG. 2 is a top orthographic representation of various components of a truck bed insert utilized in prior art construction.
Figure 7:
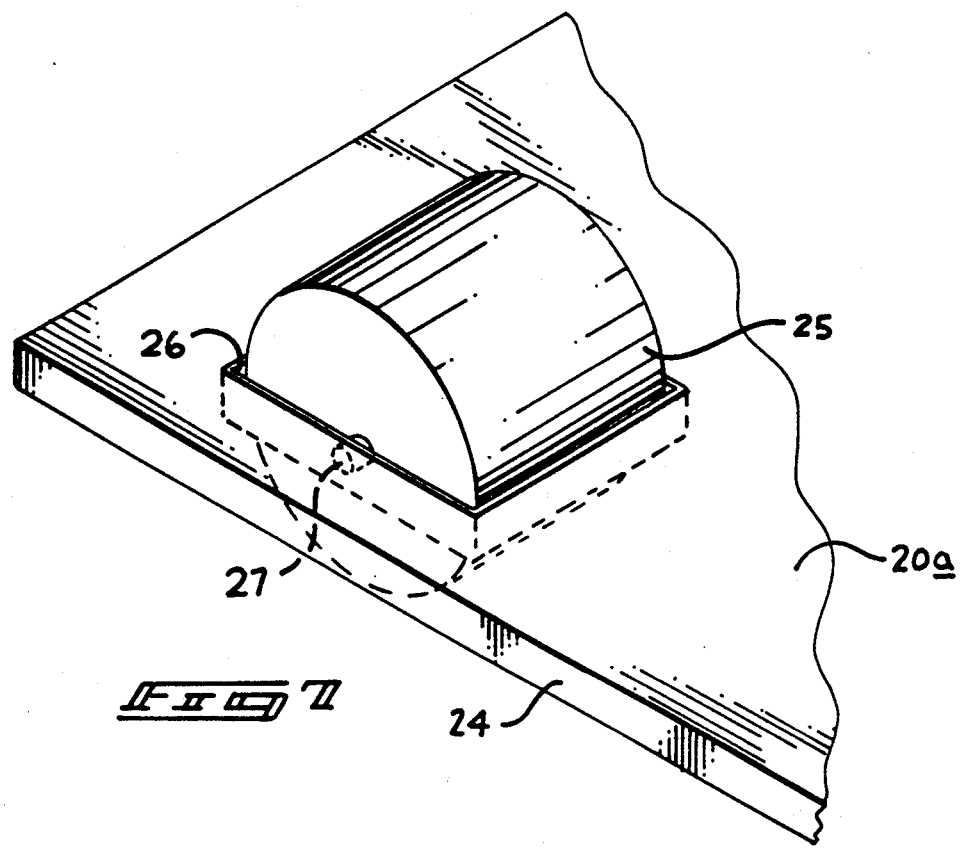
FIG. 7 is an enlarged isometric illustration of FIG. 7 as presented in FIG. 6.
Figure 8:
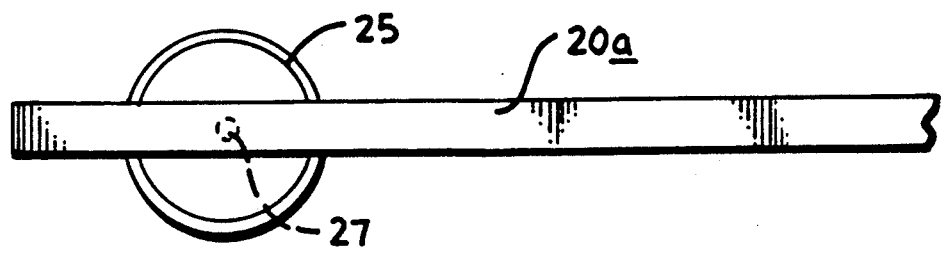
FIG. 8 is an orthographic side view of the roller structure utilized by the modified plate of the instant invention.

FIG. 1 is an isometric illustration of a prior art truck bed insert organization, as set forth in U.S. Pat. No. 4,872,720, wherein the insert 1 is mounted within a truck bed defined by respective right and left side walls 3 and 4 and a forward wall 5 mounting the insert, with a tail gate 6 overlying an end portion of the insert. FIG. 2 illustrates a prior art insert member, as set forth in U.S. Pat. No. 4,890,874, wherein the insert 2 is illustrated in a flattened configuration for subsequent erection and use in a truck bed member.

More specifically, the truck bed insert 10 of the instant invention essentially comprises a unitary truck bed insert 11 complementarily received within a truck bed of a type as utilized in FIG. 1 and incorporated herein by reference. The insert 11 includes a right side wall 12 spaced from and parallel a left side wall 13. Each side wall includes a respective flange 12a and 13a for overlying an upper terminal end surface of each of the side walls 3 and 4 of the pickup truck bed, as illustrated in FIG. 1. A liner forward wall 16 in a similar manner includes a forward wall flange 16a that is orthogonally oriented relative to the right and left flanges 12a and 13a to overlie the forward wall upper terminal end of the forward wall 5, as illustrated in FIG. 1. The insert 11 if required utilizes an illustrated right wheel well cavity 14 and an associated left wheel well cavity 15, as illustrated in phantom in FIG. 3. Similarly, the right and left side walls 12 and 13 may be of a planar configuration should there be no wheel well intrusion into the truck bed as is available in certain types of trucks whose wheel wells extend exteriorly of the side wall. Insert 11 includes a bottom floor 17, with a transparent top floor 18 spaced above and parallel the bottom floor 17. A parallelepiped cavity 19 is defined between the top and bottom floors, as defined by a predetermined cross-sectional configuration. An insert plate 20 defined by a parallelepiped external configuration substantially equal to the predetermined internal configuration of the cavity 19 to receive the plate 20 therewithin to provide structural support for the transparent top floor 18, as well as provide desired positioning of the insert plate 20 within the cavity 19. A pictorial designation 21 or a logo of a desired type is formed on the top surface of the insert plate 20. A modified insert plate 20a, as illustrated in FIG. 6, utilizes a peel-away polymeric laminate 22 that is adherably and removably mounted to the top surface of the modified insert plate 20a whose respective right and left sides 23 and 24 include a series of roller cylinders 25 whose axles 27 are each arranged parallel relative to one another and are coaxially directed through the roller cylinder 25, wherein each roller cylinder 25 is positioned through a rectangular opening 26 positioned adjacent the respective right and left sides of the modified plate 20a to enhance ease of mounting of the plate within the cavity 19.

FIG. 9 illustrates a modified insert 40 of a unitary construction utilizing pockets 41, as in the configuration of FIG. 3 for example, wherein a unitary floor 42 is utilized in lieu of a sheath. The thusly configured insert utilizing side walls and the like to complementarily be positioned within a truck bed is formed of various colorations and typically of a translucent material. The unitary floor 42 may further be formed of a transparent material to permit individuals to position various graphics between the floor of the insert 40 and a top surface of an associated truck bed. Further, the transparent construction of a unitary floor 42 permits visual observation of conditions of an associated floor, wherein subsequent leakage or the like permits an individual to effect remedial repair and servicing of the truck bed body in use. The thusly constructed liner provides an individual an opportunity to graphically enhance and utilize matching colorations to match contemporary color schemes and patterns utilized by truck owners.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A truck bed insert for mounting within a pickup truck bed, wherein the pickup truck bed includes a right side wall, a left side wall, a forward wall, and a tail gate, and the insert includes an insert right side wall spaced from an insert left side wall, and an insert forward wall, the insert right side wall includes an insert right side wall flange to overlie the right side wall of the pickup truck bed, and the insert left side wall includes an insert left side wall flange to overlie the left side wall of the pickup truck bed, and the insert forward wall includes an insert forward flange to overlie the forward wall of the pickup truck bed, and the insert including an insert bottom floor, the insert bottom floor receiving an insert plate defined by a predetermined parallelepiped external configuration thereon, and including a transparent insert top floor spaced above and parallel the insert bottom floor in a fixed spaced relationship to define a parallelepiped cavity between the insert bottom floor and the transparent insert top floor, and the parallelepiped cavity equal to the predetermined external configuration of the insert plate, and the insert plate slidably received within the parallelepiped cavity.

2. An apparatus as set forth in claim 1 wherein the insert plate includes a peel-away polymeric laminate adherably and removably mounted to a top surface of the insert plate.

3. An apparatus as set forth in claim 2 wherein the insert plate includes a plate right and an insert plate left side, the insert plate right side including a plurality of roller cylinders rotatably mounted through the insert plate adjacent the plate right side, and the plate left side including a plurality of rectangular openings to receive a roller cylinder through each rectangular opening, and each roller cylinder including a cylinder axle rotatably mounted at each roller cylinder, and wherein each cylinder axle along a respective plate right side and a plate left side are each parallel relative to one another.

* * * * *